Patented Jan. 23, 1945

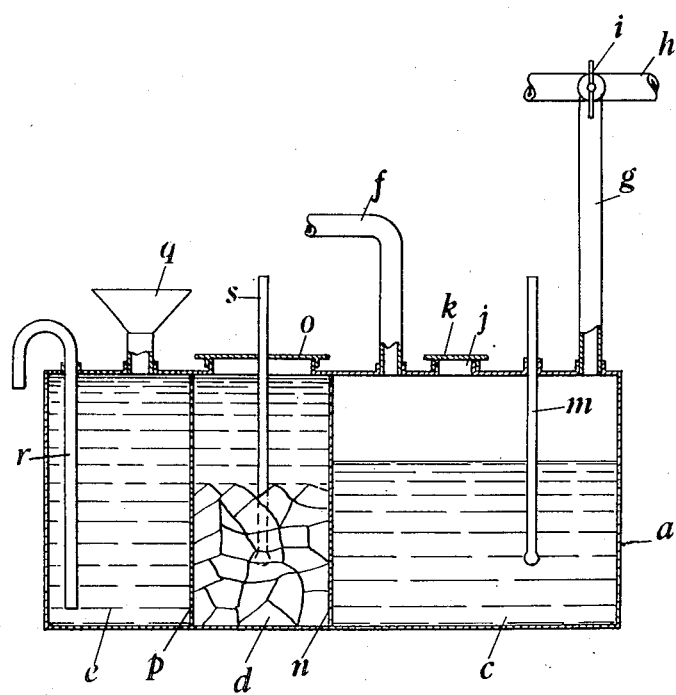

2,367,955

UNITED STATES PATENT OFFICE

2,367,955

MEANS FOR VAPORIZING ANESTHETIC LIQUIDS

Robert Reynolds Macintosh, Kurt Mendelssohn, and Richard Salt, Oxford, England

Application July 10, 1941, Serial No. 401,870
In Great Britain August 3, 1940

1 Claim. (Cl. 126—263)

This invention has for its object to provide an improved method of and means for vaporizing anesthetic liquids.

According to our invention we utilize the latent heat of crystallization of any convenient substance for imparting the required heat to the anesthetic liquid. For ether, a convenient crystalline substance is calcium chloride. This latter is liquified by heating and the heat given off during re-solidification is utilized for warming the ether, the heat transfer being effected in any convenient manner.

The accompanying drawing illustrates diagrammatically and in sectional elevation one form of apparatus constructed in accordance with the invention for vaporizing anesthetic liquid.

As shown in the drawing we employ any convenient receptacle $a$ which is divided into three compartments or chambers $c$, $d$, $e$. The compartment $c$ serves to contain the ether or other anesthetic liquid to be vaporized. This compartment $c$ is provided at its upper side with an air inlet $f$ and a vapour outlet $g$. The latter is preferably provided as shown with a branch $h$ through which an air stream can pass into the vapour stream, and with a tap $i$ whereby the ratio of air to vapour can be varied. The compartment $c$ is also provided with a charging orifice $j$ adapted to be closed by a detachable cap $k$. Moreover, provision is preferably made for mounting a thermometer $m$ in the compartment $c$. The immediately adjacent compartment $d$ which is separated from the liquid compartment $c$ by a thin metal wall $n$, is adapted to contain the crystalline substance such as calcium chloride. This compartment $d$ is provided with any convenient removable cap or cover $o$. Also provision is made for mounting a thermometer $s$ in the compartment $d$.

The third compartment $e$ is situated at the side of the second compartment $d$ remote from the first compartment $c$ and is adapted to contain water, this compartment being separated from the adjacent or second compartment by a thin metal wall $p$. The third compartment $e$ is provided with an inlet $q$ through which hot water can be introduced, and with an outflow pipe $r$ through which water can be discharged, this pipe being arranged to depend from the upper end to near the bottom of the third compartment.

To bring the apparatus above described into use, ether or other anesthetic liquid is placed in the first compartment $c$, calcium chloride or other suitable crystalline substance in the second compartment $d$, and hot water in the third compartment $e$. The effect of the heat of the water is to melt the crystalline substance, and the heat from this is imparted to the liquid to be vaporized. The communication of heat from the melted substance continues at substantially constant temperature until the substance has re-solidified. If it is required to continue the action of the apparatus a further quantity of hot water is supplied to the third compartment $e$, the cold water being displaced through the outlet pipe $r$ by the hot water.

The invention is not limited to the example above described as subordinate details of construction or arrangement may be varied. For example an alternative to the above apparatus would be one working according to the same principle but using a substance with a higher melting point so that the vapour pressure of the anesthetic liquid is above atmospheric pressure. In this case the rate of outflow of vapour can be controlled by an adjustable valve and can be measured by a flowmeter the temperature of which is also kept constant by surrounding melting crystals. Also the anesthetic vapour may be mixed with oxygen, air or other gas or mixture of gases in an additional chamber, which is warmed by surrounding melting crystals to prevent condensation of vapour from the mixture as it leaves the apparatus.

Ordinarily to promote the ready evaporation of ether or other volatile anesthetic liquid a vessel containing the liquid is surrounded by a jacket containing hot water. As evaporation is accompanied by a considerable absorption of heat, the temperature of the water is continuously lowered while evaporation is proceeding. The concentration of vapour depends on the temperature of the liquid, and consequently cooling of the jacket water is accompanied by diminishing concentration of the vapour, a condition which causes inconvenience. By our invention in which the latent heat of fusion of a crystalline substance is used for heating the volatile liquid, the heat is imparted to the liquid at a constant temperature so long as the crystalline substance remains liquid. Consequently a uniform vapour concentration is maintained, and it is only necessary periodically to re-melt the crystalline substance.

Having thus described our invention what we claim as new and desire to secure by Letters Patent is:

Apparatus for vaporizing anesthetic liquid by the latent heat of crystallization of a thermally liquifiable crystalline substance, having in combination a chamber for accommodating the anesthetic liquid, a second and adjacent chamber for accommodating the thermally liquifiable crystalline substance, a thin metal wall separating the said chambers and serving as a medium through which heat from the liquifiable substance can be imparted to the anesthetic liquid, a third chamber adapted to receive hot water, the three chambers being arranged side by side with the said second chamber situated between the other two chambers, and a thin metal wall separating the second and third chambers and serving as a medium through which heat from the water can be imparted to the said substance.

ROBERT REYNOLDS MACINTOSH.
KURT MENDELSSOHN.
RICHARD SALT.